Oct. 21, 1952 — T. M. HALSALL — 2,614,955
PRESSURE MOLDING LAMINATES
Filed Jan. 13, 1950 — 2 SHEETS—SHEET 1
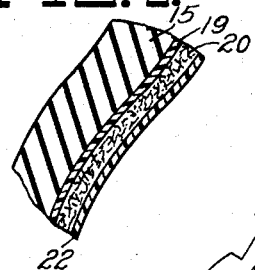
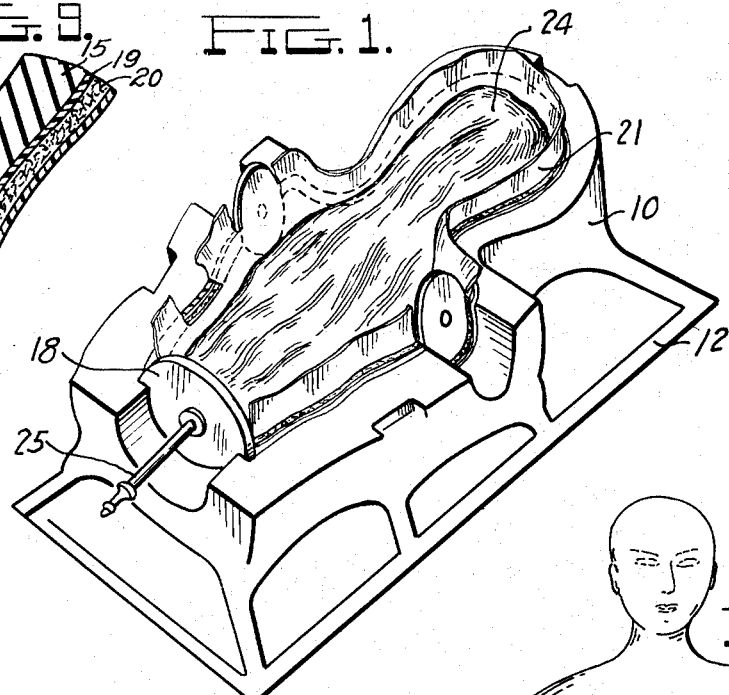
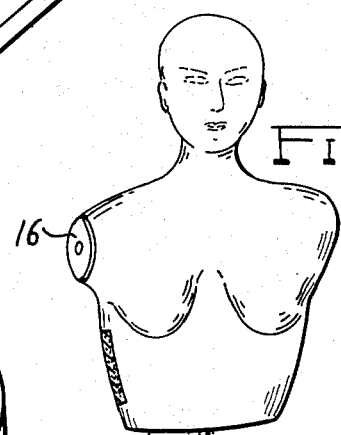
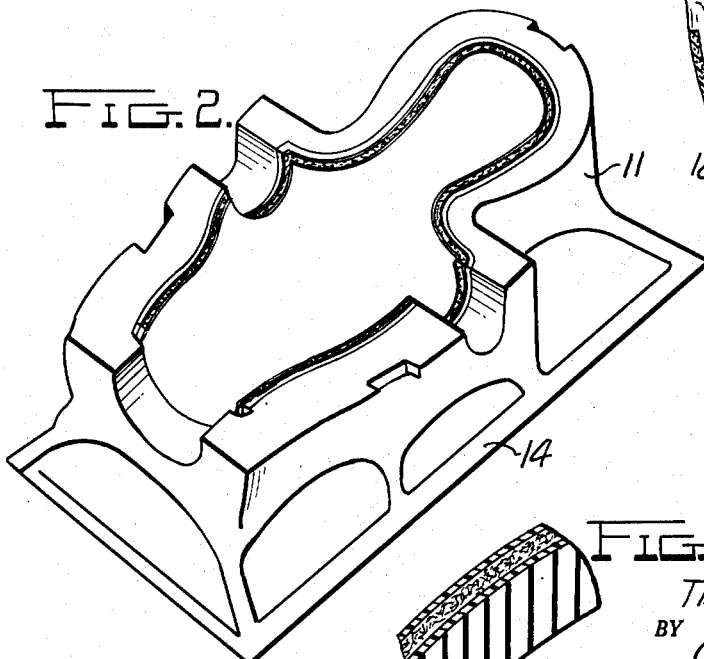
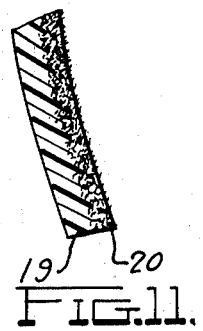
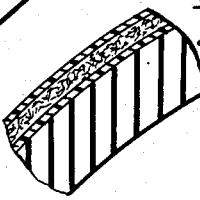
INVENTOR.
Thomas M. Halsall
BY Owen & Owen
ATTORNEYS

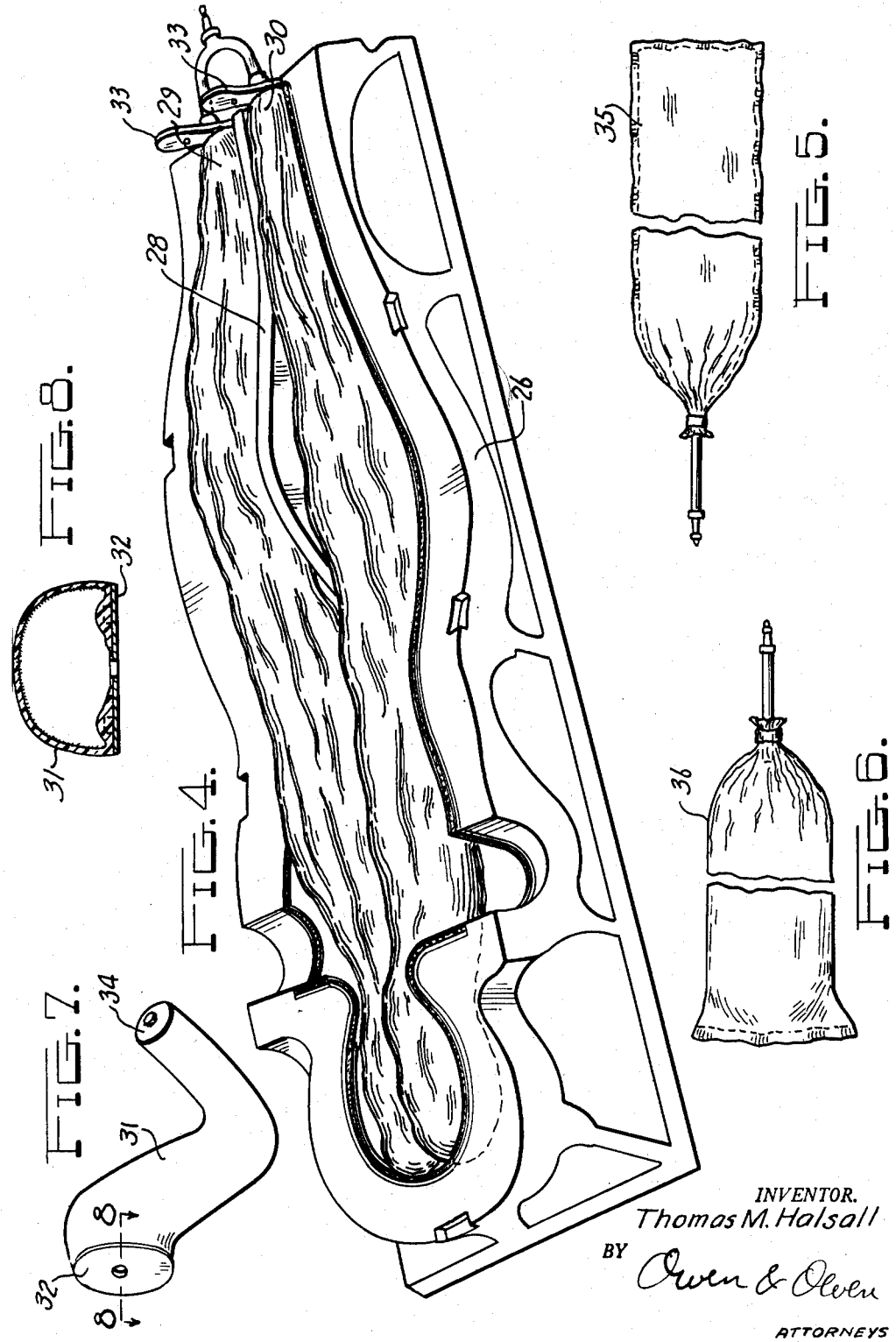

Patented Oct. 21, 1952

2,614,955

UNITED STATES PATENT OFFICE 2,614,955

PRESSURE MOLDING LAMINATES

Thomas M. Halsall, Coldwater, Mich., assignor to L. A. Darling Company, Bronson, Mich., a corporation of Delaware Application January 13, 1950, Serial No. 138,494

4 Claims. (Cl. 154—110)

This invention relates to pressure molding laminates and, more particularly, to the molding of hollow laminated articles under pressure supplied by thin, over-sized plastic bags.

Bag molding of plastic articles wherein the articles are formed under pressure applied by the walls of the bag is well known to those skilled in the art. In molding hollow articles, the bag is placed within the hollow mold and inflated to force the material to be molded against the interior surfaces of the mold. In another type of bag molding, the article is placed within a bag and the entire assembly placed within a pressure-tight chamber and subjected to pressure. A process of molding using two bags, one positioned within the article and the other surrounding the article, is also known in the bag molding art. Usually the bags employed in molding plastic articles are composed of rubber and some suitable reinforcing fabric, and are shaped to approximate the shape of the final article. Such bags are quite expensive and have a relatively short life.

The molding of laminates involves certain problems peculiar thereto which must be overcome before a satisfactory laminated article can be produced. Where a smooth surfaced article is to be made, the backing material must be held against the layer of plastic forming the surface of the article under sufficient pressure to effect a good bond therebetween, yet a low enough pressure to avoid pushing the backing material through the thin outer layer. This problem is particularly acute when the outer layer of plastic material is still in a soft stage when the lamination step occurs.

Where the article includes difficult reproducible designs or shapes, thick, unshaped rubber bags will not uniformly expand into the narrow depressions, such as the nose of a mannequin, so that these bags must be shaped to approximate the contours of the final article. Even then, considerable pressure is required to uniformly expand the rubber bag against the inside surfaces of the mold. Such a procedure makes these rubber bags expensive and limits them to the production of one type of article.

Another very real problem which exists in the molding of plastic laminates is that created by the use of catalyzed monomeric plastic materials. During the polymerization, many of these monomeric plastic materials give off considerable heat, so that the temperature of the plastic material reaches 250° F. or higher. The heat plus the presence of the highly active monomer considerably shortens the life of rubber bags coming into contact therewith, so as to make bag-molding of such plastic laminates with the rubber bags impractical.

Another difficulty encountered in molding hollow plastic laminates is the removal of the bag where the opening, or openings, in the hollow article is closed by an insert molded in place. For example, in molding an arm for a mannequin, a shoulder insert and a wrist insert are preferably molded in place, and the only opening in the entire article is a ¾" opening in the shoulder insert. It will be obvious, that a rubber bag of the type now in general use cannot be employed to mold such an article, because the bag cannot be removed through the small ¾" opening.

It is an object of this invention, therefore, to provide a method of pressure molding laminates in which detailed impressions can be accurately reproduced using low pressures and inexpensive equipment.

Another object of this invention is to provide a method of pressure-molding hollow plastic laminates which employs an unshaped, over-sized plastic fluid container, which is sensitive to low pressures.

A further object of this invention is to provide a new and improved method of bag molding monomeric plastic materials and fibrous backing materials into hollow, smooth surfaced plastic laminates, wherein the bag that is employed for imparting the pressure directly contacts the monomeric plastic material during polymerization.

Still another object of this invention is to provide a method of pressure molding smooth surfaced plastic laminates into articles having detailed impressions therein at low molding pressures, said pressures being so low that the reinforcing material is not apparent on the face of the article.

A still further object of this invention is to provide a method of molding smooth-faced plastic articles by pressure molding laminates with a film-type, pressure sensitive, disposable plastic bag.

Yet another object of this invention is to provide a new and improved method of molding laminated plastic articles under fluid pressure while the surface layer is still soft.

Other objects and advantages of the present invention will become apparent from the following detailed description thereof when read in conjunction with the accompanying drawings, in which—

Figure 1 is a perspective view of the bottom half of a two-part mold;

Fig. 2 is a perspective view of the top mold half which complements the mold shown in Fig. 1;

Fig. 3 is a perspective view of a display bust molded in the molds shown in Figs. 1 and 2;

Fig. 4 is a perspective view of the bottom half of a two-part mold for forming a full length mannequin, showing the inflatable bags in place;

Figs. 5 and 6 illustrate two types of inflatable bags;

Fig. 7 is a perspective view of a plastic arm with molded inserts;

Fig. 8 is a cross-sectional view taken on line 8—8 of Fig. 7;

Fig. 9 is a magnified section of the laminate shown in Fig. 1;

Fig. 10 is a magnified section of a laminate shown in Fig. 2; and

Fig. 11 is a magnified section of the laminated wall shown in Fig. 3.

In order to describe and illustrate the present invention with reference to the production of some specific article or articles, this invention will be described in detail with regard to its application in the production of mannequins and other display articles. In the past, mannequins have been made of plaster or of papier-mâché. In either event, the resulting article is quite fragile and readily broken if dropped or mishandled. Furthermore, the production of these mannequins or display forms requires considerable expert labor, since numerous finishing operations are involved.

In making mannequins according to the present invention, a divided hollow mold is first produced. These molds are customarily the conventional two-part molds made of plaster, although other materials may be employed. In Figs. 1 and 2, a bottom mold half 10 and an upper mold half 11 of plaster material are supported upon metal frames 12 and 14, respectively. Since the bust display form molded in molds 10 and 11 includes undercut portions particularly around the ears, it is preferred to employ a relatively thick resilient liner or mold 15 in both mold halves. This lining 15 may be made from a variety of elastomeric materials, but polyvinyl chloride containing a relatively small amount of plasticizer is preferred, since it is sufficiently hard to produce impressions in the molded article with the maximum of accurate reproduction.

After the liner 15 is in place, shoulder inserts, 16, 16, along with a midsection insert 18, are placed in the mold. The liner 15 may be coated with a suitable mold lubricant, such as a solution of methyl ethyl ketone peroxide and dimethyl phthalate, silicones, beeswax in kerosene, heavy waxes, etc. A coating 19 of a liquid plastic material which is hardenable, is then applied to the interior of both mold halves by spraying, brushing or other suitable manner. Liquid plastic materials may be "hardenable" by polymerization with either a catalyst or heat, by cooling in the case of thermoplastic materials, or by heat in the case of thermosetting materials. Monomeric plastic materials are much to be preferred, since the hardening of these plastics may be easily and accurately controlled. In one preferred form, a room temperature catalyst is employed along with an extender or filler. The function of the extender, which may be calcium carbonate or other inorganic compound, is to decrease the cost of the outer layer and to impart an opaqueness thereto. When a resilient mold is used, the extender may be used to avoid or reduce the attack of the liquid monomer upon the resilient mold. In certain instances where the liquid plastic material has such a low viscosity that a sufficiently thick layer cannot be obtained in one coating, additional coatings may be applied until a layer of the desired thickness is built up.

This plastic surface layer 19 is allowed to partially polymerize so as to produce a soft solid layer. A backing or strengthening material 20 is then applied to the layer 19 and is held in place thereon by lightly pressing the backing material against the layer 19. Fibrous backing material, such as glass mat, is preferred, because it is the easiest to handle, is extremely cheap, and has a maximum strengthening effect. In laying up the fibrous backing material 20, an upwardly extending tab 21 is provided about the circumference of the lower mold half 10, which tab assists in joining the two halves of the molded article.

In order to obtain the maximum amount of strengthening from the backing material, as well as to aid in bonding the backing material to the surface layer 19, a second layer of hardenable plastic material 22 is applied to the backing material 20. Since the plastic coating material is in a liquid state, it flows into and through the fibrous backing material 20 so as to thoroughly impregnate it. This coating material is preferably the same as that employed in the production of the surface layer 19, with the exception that the extender is omitted in order to obtain maximum strength properties. If the plastic material employed in layer 22 is not the same as that in layer 20, it should preferably be so selected as to effect a bonding of the fibrous backing material 20 to the layer 19.

After the laminates have been placed in position in both mold halves, a film type plastic bag 24 is positioned in one of the mold halves, in this particular case in the lower mold half 10. As shown in the drawings, this bag is unshaped in that it need not in any way correspond to the contours of the mold, and is oversized in that, in the inflated condition it has a greater volume than the mold when closed. In this connection, it is important to note that the bag, being oversized, is not expanded or extended in the inflated condition, so as to stretch the walls of the bag. This point is critical, since a film-type bag has such thin walls that tensioning of the bag walls by stretching them would cause a rapid blowout of the bag when placed in contact with the catalyzed monomeric resin. It is for this reason, that the bag must be sufficiently oversized that it never becomes expanded, that is, stretched, in the inflated condition.

By "film-type" bag is meant plastic bags varying in thickness from about .001" to about .010". A large number of plastic materials are suitable for this particular use, among these are polyethylene, cellophane, and rubber hydrochloride.

In positioning the film-type plastic bag in the lower mold half 10, it is only necessary to be certain that the bag will not require expansion to fill the mold interior. The presence of wrinkles or creases is not detrimental to the formation of a smooth faced article, since the wall of the bag is so thin that the surface remains smooth and unblemished. It is necessary, however, that the inflation of the bag occur shortly after the bag is positioned within the mold, since certain types of resins will react with the bag material to puncture the same if left in contact therewith.

The mold is then closed by placing the upper mold half 11 over the lower mold half 10 and clamping in place. An air nozzle 25 may be attached to the plastic bag 24 in any suitable manner, but one satisfactory method is to merely wrap the open end of the bag about the nozzle and hold it in place by means of tape (see Figures 5 and 6). The nozzle 25 is connected to a source of fluid pressure, such as an air supply line, and the bag inflated under pressure which usually ranges from about one pound to above five pounds.

The bag is maintained in an inflated condition for a period of time sufficient to permit the hardenable plastic materials in the laminate to harden to such an extent that the article will retain its shape upon removal from the mold. The air nozzle 25 is then removed from the bag 24 which may be left in the mold. The mold is then opened and the article removed to an oven where the plastic materials in the laminate are fully cured. If desired, however, heated fluid may be introduced into the bag in the mold interior to cure or to assist in curing the plastic materials while within the mold.

As shown in Fig. 3, the metal inserts 16 and 18 are molded in place and the detailed features of the form, such as the nose, mouth and ears, are clearly and accurately reproduced. Backing material 20 is pressed into the surface layer 19, as shown in the magnified section of Fig. 11, and the interior layer of plastic material 22 has become completely dispersed throughout the backing material 20. The tab 21 is pressed against the backing material of the upper mold and becomes joined thereto as the plastic materials harden. In this manner, the two molded halves become completely and uniformly joined.

Fig. 4 illustrates one of the advantages of the present invention which results from the fact that the bags employed are disposable. Also, the extreme thinness of the bag walls makes them highly sensitive to pressure so that large articles, such as an entire mannequin, can be molded under extremely low pressures. A full length mannequin mold half 26 has a raised dividing portion 28 which separates the legs of the mannequin. The two bags 29 and 30 extend downwardly from the head through the respective legs. Since the bags need not be shaped to correspond to the contours of the mold, two oversized tube shaped bags, for example, can be satisfactorily employed to mold a full length mannequin in the manner above described. The bags 29 and 30 may be left in place and the entire interior of the mannequin closed by shoulder inserts and sole inserts 33—33 with the exception of two small holes in the sole inserts.

Another particular application of the present invention is the molding of hollow arms, such as the arm 31 shown in Fig. 7. Both ends of the arm 31 are closed by a shoulder insert 32 and a wrist insert 34 which are molded in place, the only opening in the entire article being a small hole in the shoulder insert.

These two applications of the present invention clearly illustrate very important advantages of the present process. It would be impossible to mold a full length mannequin with a preformed rubber bag, since such a bag could not be removed through the legs because of the dividing portion 28, nor through the head where a hole sufficiently large to permit removal of the bag would be extremely unsightly. Nor could an entirely inclosed display article, such as the arm 31, shown in Fig. 7, be made using a formed rubber bag, since the only opening is a small ¾" hole in the shoulder insert. Such articles can, however, be readily and accurately produced using the present process in the manner described.

In order to further assist those skilled in the art in practicing the present invention, a specific example illustrating the application of this invention to the production of a bust display model is hereinafter set forth.

*Example*

In the production of a bust display model of the type shown in Fig. 3, bottom and top mold halves similar to 10 and 11 were prepared and were lined with an elastic mold of polyvinyl chloride containing a low percentage of plasticizer. Metal inserts were positioned in place at the shoulders and the mid-section. The interior of the mold was then lubricated with glyceryl oleate and subsequently coated with a composition comprising by weight, 46% of the monomer of polyester resin, 3% of a 60% solution of methyl ethyl ketone peroxide in dimethyl phthalate, 1% finely divided metallic cobalt, and 50% calcium carbonate. After this liquid plastic material had been brushed onto the interior surface of the mold so that uniform, continuous coating was formed, it was allowed to set for approximately ten minutes and a second coating applied in order to obtain a thicker layer upon the mold. After allowing the second coating to set for ten minutes, glass mat was laid up against the soft solid surface layer, and a tab of this backing material was arranged around the circumference of the lower mold half. A second resin coating identical with the first, except for the omission of the calcium carbonate, was applied to the backing material with a brush. A polyethylene bag having a thickness of .002" to .003" was arranged in the bottom mold, being careful to place the bag under the tab which is then free to contact the upper mold half. This bag was sufficiently oversized that there would be no expansion of the bag material upon inflation of the bag. The mold was closed and the bag inflated by introducing air therein under a pressure of approximately one pound per square inch. Air within the mold but outside of the bag was forced out between the two halves of the mold along with certain extraneous resin material. Air pressure was maintained upon the bag for a period of ten minutes, at the end of which time the air nozzle was removed from the bag. The molded mannequin was removed from the mold in the gel state. It was then placed in an oven for the complete polymerization—15 minutes at 150° F., 15 minutes at 200° F., and 15 minutes at 250° F. Upon removal from the oven, the finished article was found to be smooth and to be an accurate reproduction of the mold contours.

The advantages of the present invention as applied to mannequins and other display forms, result in faster and cheaper production. The reason for this is that the number of finishing operations required are greatly reduced and no time-consuming, highly skilled repair work is required. In addition, a better product is obtained, since the laminated plastic mannequin or display form is much more resistant to breakage than the old type plaster or papier-mâché form. Furthermore, the plastic mannequin may be produced with much greater uniformity than the previous type mannequins, and their lightness in weight makes them extremely easy to handle.

While the present invention has been described in detail with regard to its application to the production of mannequins and other display forms, it will be apparent that this invention is applicable to the production of a large number of other unrelated articles. The present invention is particularly advantageous in the production of hollow laminated articles, but may also be applied to the production of articles having concave or convex shapes. For example, half-forms may be produced by positioning the laminate within a half mold, locating a bag therein, clamping a flat plate over the top of the mold and inflating the bag.

In addition, numerous variations and modifications may be made in the present invention, as above described, without departing from the present invention. Backing material of the non-fibrous type may be employed, but the fibrous type of backing material is much preferred over the other types, since it is easier to handle and strengthens the laminate. Although an unshaped bag has been described, a shaped film-type bag may be used. Because of the cost in producing such a bag, there appears to be no advantage in employing a shaped bag instead of an unshaped bag. The bag must be thin and must be oversized, but the shape of the bag is unimportant. For example, Fig. 5 shows an envelope type bag 35 made by heat-sealing the edges of two flat, film-type sheets of plastic together. Another form of bag which may be used is shown in Fig. 6 in which tubing 36 is heat-sealed at one end, or otherwise sealed, to provide an air-tight bag.

The use of low pressures is important in order to avoid pushing the backing material through the thin plastic surface coating. The amount of pressure required will vary with the type of plastic material used, the thickness of the surface coating, and the particular type of backing material employed. Under certain circumstances, the second coating applied to the interior of the backing material may be omitted, but a much inferior product results. For this reason, it is necessary to employ the second plastic coating upon the interior of the backing material in order to obtain an article having the maximum strength. Other variations and modifications of the present invention will be apparent to those skilled in the art.

What I claim is:

1. A method of molding a mannequin or similar display form of reenforced plastic material in a two section mold, which comprises coating the interior of each of said sections with a hardenable liquid plastic, polymerizing the plastic to obtain the coating in a soft solid state, laying up foraminous reenforcing sheet material in intimate contact with the plastic coating in each of said mold sections, with said sheet material extending beyond the edge of one of said mold sections to provide a reenforcing tab extending across the mating line between said mold sections when closed and with at least an air escape passage to the interior of said mold sections left unobstructed, placing a generally tubular uninflated bag of sheet material having a wall thickness from 0.001 inch to 0.010 inch having an inflated volume greater than the volume of said mold when closed in one of said mold sections, closing the mold, introducing fluid into the bag at low pressures not exceeding about five pounds per square inch, maintaining the pressure in the bag until the plastic material has polymerized to a definite set, and removing the fluid pressure from the bag and inserting the entire assembly into a heated oven to further cure the plastic material.

2. A method of molding a mannequin or similar display form of reenforced plastic material in a two section mold, which comprises positioning a resilient liner in each of said sections, coating the interior of each liner with a hardenable liquid plastic, polymerizing the plastic to obtain the coating in a soft solid state, laying up foraminous reenforcing sheet material in intimate contact with the plastic coating in each of said mold sections, with said sheet material extending beyond the edge of one of said mold sections to provide a reenforcing tab extending across the mating line between said mold sections when closed and with at least an air escape passage to the interior of said mold sections left unobstructed, placing a generally tubular uninflated bag of thin sheet material having an inflated volume greater than the volume of said mold when closed in one of said mold sections, closing the mold, introducing fluid into the bag at low pressures not exceeding about five pounds per square inch, maintaining the pressure in the bag until the plastic material has polymerized to a definite set, and removing the fluid pressure from the bag and inserting the entire assembly into a heated oven to further cure the plastic material.

3. A method of molding a mannequin or similar display form of reenforced plastic material in a two section mold, which comprises positioning a resilient liner in each of said sections, coating the interior of each liner with a hardenable liquid plastic, polymerizing the plastic to obtain the coating in a soft solid state, laying up foraminous reenforcing sheet material in intimate contact with the plastic coating in each of said mold sections, with said sheet material extending beyond the edge of one of said mold sections to provide a reenforcing tab extending across the mating line between said mold sections when closed and with at least an air escape passage to the interior of said mold sections left unobstructed, placing a generally tubular uninflated bag of sheet material having a wall thickness from 0.001 inch to 0.010 inch having an inflated volume greater than the volume of said mold when closed in one of said mold sections, closing the mold, introducing fluid into the bag at low pressures not exceeding about five pounds per square inch, maintaining the pressure in the bag until the plastic material has polymerized to a definite set, and removing the fluid pressure from the bag and inserting the entire assembly into a heated oven to further cure the plastic material.

4. In a method of molding a mannequin or similar display form of reenforced plastic material in a two section mold, which comprises coating the interior of each of said sections with a hardenable liquid plastic, polymerizing the plastic to obtain the coating in a soft solid state, laying up foraminous reenforcing sheet material in intimate contact with the plastic coating in each of said mold sections, with said sheet material extending beyond the edge of one of said mold sections to provide a reenforcing tab extending across the mating line between said mold sections when closed and with at least an air escape passage to the interior of said mold sections left unobstructed, placing a generally tubular uninflated bag of thin sheet material having an inflated volume greater than the volume of said mold when closed in one of said mold sections, closing the mold, introducing fluid into the bag at low pressures not exceeding about five pounds per square inch, maintaining the pressure in the bag until the plastic material has polymerized to a definite set, and removing the fluid pressure from the bag and inserting the entire assembly into a heated oven to further cure the plastic material, the improvement that consists in providing a resilient liner for each mold section.

THOMAS M. HALSALL.

REFERENCES CITED

The following references are of record in the file of this patent:

UNITED STATES PATENTS

| Number | Name | Date |
|---|---|---|
| 2,285,370 | Staelin | June 2, 1942 |
| 2,451,131 | Vidal et al. | Oct. 12, 1948 |